(12) United States Patent
Sakai et al.

(10) Patent No.: US 11,522,207 B2
(45) Date of Patent: Dec. 6, 2022

(54) FUEL CELL SYSTEM, METHOD OF CONTROLLING FUEL CELL SYSTEM, AND STORAGE MEDIUM

(71) Applicant: HONDA MOTOR CO., LTD., Tokyo (JP)

(72) Inventors: Ryoji Sakai, Wako (JP); Akihiro Matsui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 17/023,415

(22) Filed: Sep. 17, 2020

(65) Prior Publication Data

US 2021/0098802 A1    Apr. 1, 2021

(30) Foreign Application Priority Data

Sep. 27, 2019   (JP) .............................. JP2019-176860

(51) Int. Cl.
*H01M 8/04858*   (2016.01)
*H01M 8/04082*   (2016.01)
*H01M 8/04746*   (2016.01)
*B60L 58/40*   (2019.01)
(Continued)

(52) U.S. Cl.
CPC ........... *H01M 8/0494* (2013.01); *B60L 58/12* (2019.02); *B60L 58/34* (2019.02); *B60L 58/40* (2019.02); *H01M 8/04201* (2013.01); *H01M 8/04753* (2013.01); *H01M 2250/20* (2013.01)

(58) Field of Classification Search
CPC .......... B60L 58/12; B60L 58/34; B60L 58/40; H01M 2250/20; H01M 10/443; H01M 10/486; H01M 2220/20; H01M 16/006; H01M 12/08; Y02T 10/70; Y02T 10/7072; Y02T 90/14; Y02T 90/40
See application file for complete search history.

(56) References Cited

FOREIGN PATENT DOCUMENTS

| JP | 2004-281219 | 10/2004 |
| JP | 2010-259281 | 11/2010 |
| JP | 2013-093941 | 5/2013 |

(Continued)

OTHER PUBLICATIONS

Japanese Office Action for Japanese Patent Application No. 2019-176860 dated Jun. 8, 2021.

(Continued)

*Primary Examiner* — Adam A Arciero
(74) *Attorney, Agent, or Firm* — Amin, Turocy & Watson, LLP

(57) ABSTRACT

A fuel cell system includes fuel cell, an electrical storage device that stores electric power generated by the fuel cell, and a control device that controls generation of power by the fuel cell, that acquires a charging rate of the electrical storage device, when the electric power in the electrical storage device is supplied to external devices, the control device performs first control which increases a charging rate of the electrical storage device and second control which restricts a power generation amount of the fuel cell to be smaller than in the first control and decreases a charging rate of the electrical storage device, and when a temperature detected by the temperature sensor is lower than a predetermined temperature, a power generation amount per hour of the fuel cell in the first control is reduced in comparison when the detected temperature is equal to or greater than the predetermined temperature.

7 Claims, 9 Drawing Sheets

(51) Int. Cl.
*B60L 58/12* (2019.01)
*B60L 58/34* (2019.01)

(56) References Cited

FOREIGN PATENT DOCUMENTS

| | | |
|---|---|---|
| JP | 2013-198284 | 9/2013 |
| JP | 2013-198292 | 9/2013 |
| JP | 2014-056771 | 3/2014 |
| JP | 2014-060838 | 4/2014 |
| JP | 2015-220961 | 12/2015 |
| JP | 2016-086551 | 5/2016 |
| JP | 2020-102344 | 7/2020 |
| WO | 2018/084152 | 5/2018 |

OTHER PUBLICATIONS

Japanese Office Action for Japanese Patent Application No. 2019-176860 dated Dec. 7, 2021.
Japanese Office Action for Japanese Patent Application No. 2019-176860 dated Jun. 14, 2022.

FUEL CELL SYSTEM, METHOD OF CONTROLLING FUEL CELL SYSTEM, AND STORAGE MEDIUM

CROSS-REFERENCE TO RELATED APPLICATION

Priority is claimed on Japanese Patent Application No. 2019-176860, filed Sep. 27, 2019, the content of which is incorporated herein by reference.

BACKGROUND OF THE INVENTION

Field of the Invention

The present invention relates to a fuel cell system, a method of controlling a fuel cell system, and a storage medium.

Description of Related Art

In the related art, when supplying power from a fuel cell vehicle to an external power supply device, a technology is known for ensuring an operating efficiency of a fuel cell stack by maintaining a flow rate of air supplied to the fuel cell stack at a predetermined flow rate or more, regardless of a state of the fuel cell stack, in a case a state of the fuel cell stack is intermittently switched between efficiency priority driving and output limited driving or power generation stoppage on the basis of a state of charge (SOC) of a battery is known (for example, see Japanese Unexamined Patent Application, First Publication No. 2014-56771).

SUMMARY OF THE INVENTION

However, in the related art, changes in an electric storage capacity of a battery due to changes in an external environment have not been considered.

An aspect of the present invention is directed to providing a fuel cell system, a method of controlling a fuel cell system, and a storage medium that are capable of supplying power to devices external to a vehicle while protecting a battery.

A fuel cell system, a method of controlling a fuel cell system, and a storage medium according to the present invention employ the following configurations.

(1) A fuel cell system according to an aspect of the present invention includes a fuel cell; an electrical storage device with a temperature sensor built thereinto or attached thereto and configured to store electric power generated by the fuel cell; and a control device configured to perform power generation control for at least the fuel cell, wherein the control device acquires a charging rate of the electrical storage device, when the electric power stored in the electrical storage device is supplied to external devices, the control device performs a first control which causes the fuel cell to generate power and increases a charging rate of the electrical storage device and a second control which restricts a power generation amount of the fuel cell to be smaller than that in the first control and decreases a charging rate of the electrical storage device, and when a temperature detected by the temperature sensor is lower than a predetermined temperature a power generation amount per hour of the fuel cell in the first control is reduced in comparison with a case in which the temperature detected by the temperature sensor is equal to or greater than the predetermined temperature.

(2) In the aspect of the above-mentioned (1), the control device may switch the first control to the second control when the charging rate of the electrical storage device is increased to be equal to or greater than a first threshold in a case the first control is performed, and may switch the second control to the first control when the charging rate of the electrical storage device is decreased to be less than a second threshold in a case the second control is performed.

(3) In the aspect of the above-mentioned (1) or (2), the control device may cause the fuel cell to generate power with a power generation amount in which a power generation efficiency of the fuel cell is high when the first control is performed.

(4) In the aspect of the above-mentioned (1) to (3), the fuel cell system may be mounted on a vehicle, and may further include a feeding apparatus configured to feed the electric power stored in the electrical storage device to devices external to the vehicle.

(5) In the aspect of the above-mentioned (4), the feeding apparatus may be able to be connected to an external electrical storage device provided outside the vehicle, when the first control is performed by the control device, the electric power generated by the fuel cell may be supplied to the external electrical storage device and also supplied to the devices external to the vehicle, and when the second control is performed by the control device, the electric power discharged from the electrical storage device and the electric power discharged from the external electrical storage device may be supplied to the devices external to the vehicle.

(6) In the aspect of the above-mentioned (5), the feeding apparatus may initially supply the electric power discharged from the external electrical storage device to the devices when the second control is performed by the control device.

(7) In the aspect of the above-mentioned (1) to (6), the fuel cell system may further include a heating part provided at a position at which heat is transferred to the electrical storage device and configured to generate heat using the electric power supplied from the electrical storage device, wherein the control device supplies the electric power stored in the electrical storage device to the heating part so as to generate heat when the temperature of the electrical storage device is less than the predetermined temperature.

(8) A method of controlling fuel cell system according to another aspect of the present invention is performed by a control device of a fuel cell system including: a fuel cell; and an electrical storage device with a temperature sensor built thereinto or attached thereto and configured to store electric power generated by the fuel cell, the method including: performing generation control of at least the fuel cell; acquiring a charging rate of the electrical storage device; performing a first control which causes the fuel cell to generate power and increases a charging rate of the electrical storage device when the electric power stored in the electrical storage device is supplied to external devices and a second control which restricts a power generation amount of the fuel cell to be smaller than that in the first control and decreases a charging rate of the electrical storage device; and reducing a power generation amount per hour of the fuel cell in the first control in comparison with a case in which the temperature detected by the temperature sensor is equal to or greater than the predetermined temperature when the temperature detected by the temperature sensor is less than a predetermined temperature.

(9) A storage medium according to another aspect of the present invention, on which a program is stored, is provided, and the program is configured to cause a control computer of a fuel cell system including: a fuel cell; and an electrical storage device with a temperature sensor built thereinto or attached thereto and configured to store electric power generated by the fuel cell, to perform processing of performing generation control of at least the fuel cell; processing of acquiring a charging rate of the electrical storage device; processing of performing a first control which causes the fuel cell to generate power and increases a charging rate of the electrical storage device when the electric power stored in the electrical storage device is supplied to external devices and a second control which restricts a power generation amount of the fuel cell to be smaller than that in the first control and decreases a charging rate of the electrical storage device; and processing of reducing a power generation amount per hour of the fuel cell in the first control in comparison with a case in which the temperature detected by the temperature sensor is equal to or greater than the predetermined temperature when the temperature detected by the temperature sensor is less than a predetermined temperature.

According to the aspects of the above-mentioned (1) to (9), it is possible to feed power to devices external to a vehicle while protecting a battery.

DETAILED DESCRIPTION OF THE INVENTION

First Embodiment

Hereinafter, a first embodiment of a fuel cell system, a method of controlling a fuel cell system, and a storage medium, on which a program is stored, of the present invention will be described with reference to the accompanying drawings. In the following description, an electrically driven vehicle 1 is a fuel cell vehicle using electric power generated in a fuel cell as electric power for traveling. In addition, in the following description, control devices in the fuel cell system may be realized by executing a program (software) using a hardware processor such as a central processing unit (CPU) or the like. In addition, some or all of these components may be realized by hardware (a circuit part; including circuitry), such as a large scale integration (LSI), an application specific integrated circuit (ASIC), a field programmable gate array (FPGA), a graphics processing unit (GPU), or the like, or may be realized by cooperation of software and hardware. The program may have been previously stored in a storage device such as a hard disc drive (HDD), a flash memory, or the like (a storage device including a non-transient storage medium), stored in a detachable storage medium such as a digital video disc (DVD), a compact disc read only memory (CD-ROM), or the like, or installed on a HDD or a flash memory by mounting the storage medium (non-transient storage medium) on a drive device.

[Electrically Driven Vehicle]

Figure 1:
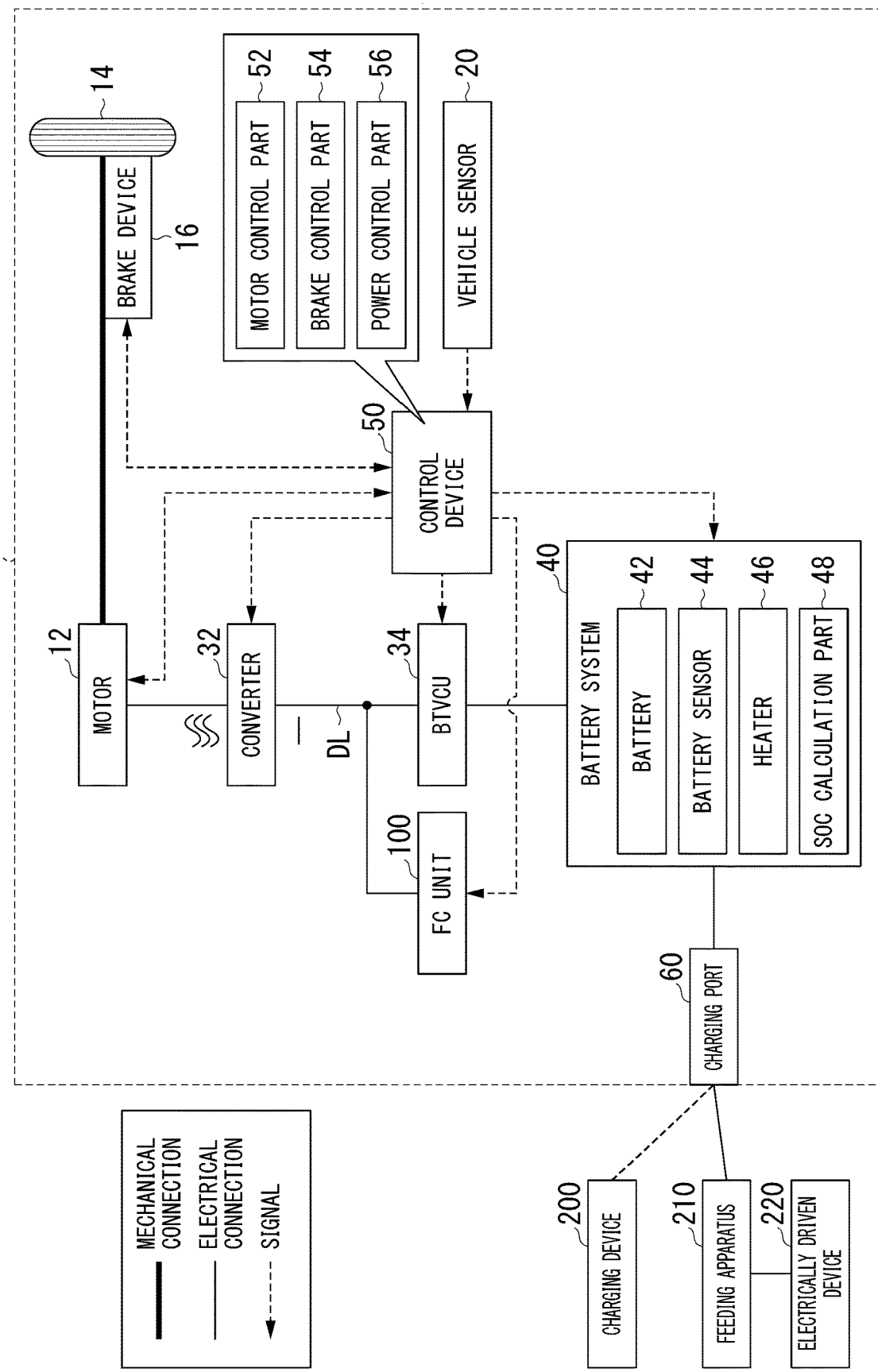
FIG. 1 is a view showing an example of a configuration of an electrically driven vehicle according to a first embodiment.

FIG. 1 is a view showing an example of a configuration of a fuel cell system 10. The fuel cell system 10 is, for example, a system which is mounted in the electrically driven vehicle 1. The fuel cell system 10 is a stationary type system. The electrically driven vehicle 1 is a fuel cell vehicle using the electric power generated in a fuel cell as electric power for traveling. The fuel cell system 10 includes at least a motor 12, driving wheels 14, a brake device 16, a vehicle sensor 20, a converter 32, a battery voltage control unit (BTVCU) 34, a battery system (an electrical storage device) 40, a control device 50, a charging port 60 and a fuel cell (FC) unit 100. The fuel cell system 10 may include a feeding apparatus 210.

The motor 12 is, for example, a three-phase alternating current motor. A rotor of the motor 12 is connected to the driving wheels 14. The motor 12 outputs a driving force used for traveling of the electrically driven vehicle 1 to the driving wheels 14 using at least one of electric power generated by the FC unit 100 and electric power stored by the battery system 40. In addition, the motor 12 generates power using kinetic energy of the vehicle upon deceleration of the vehicle.

The brake device 16 includes, for example, a brake caliper, a cylinder configured to transmit a hydraulic pressure to the brake caliper, and an electric motor configured to generate a hydraulic pressure in the cylinder. The brake device 16 may include a mechanism configured to transmit a hydraulic pressure generated by an operation of a brake pedal to the cylinder via a master cylinder as a backup. Further, the brake device 16 is not limited to the above-mentioned configuration and may be an electronically-controlled hydraulic brake device configured to transmit a hydraulic pressure of the master cylinder to the cylinder.

The vehicle sensor 20 includes an accelerator opening sensor, a vehicle speed sensor and a brake depression amount sensor. The accelerator opening sensor is attached to an accelerator pedal that is an example of an operator configured to receive an acceleration instruction of a driver, detects an operation amount of an accelerator pedal, and outputs the operation amount to the control device 50 as an accelerator opening degree. The vehicle speed sensor includes, for example, wheel speed sensors attached to wheels, and a speed calculator, combines the wheel speeds detected by the wheel speed sensors to derive a speed of the vehicle (a vehicle speed), and outputs the vehicle speed to the control device 50. The brake depression amount sensor is attached to a brake pedal, detects an operation amount of the brake pedal, and outputs the operation amount to the control device 50 as a brake depression amount.

The converter 32 is, for example, an AC-DC converter. A DC-side terminal of the converter 32 is connected to a DC link DL. The battery system 40 is connected to the DC link DL via the BTVCU 34. The converter 32 converts an AC voltage generated by the motor 12 into a DC voltage and outputs the converted DC voltage to the DC link DL.

The BTVCU 34 is, for example, a boosting type DC-DC converter. The BTVCU 34 boosts the DC voltage supplied from the battery system 40 and outputs the boosted DC voltage to the DC link DL. In addition, the BTVCU 34 outputs a regenerative voltage supplied from the motor 12 or a FC voltage supplied from the FC unit 100 to the battery system 40.

The battery system 40 includes, for example, a battery 42, a battery sensor 44, a heater 46 and an SOC calculating part 48.

The battery 42 is, for example, a secondary battery such as a lithium ion battery or the like. The battery 42 stores, for example, electric power generated in the motor 12 or the FC unit 100, and performs discharge for traveling of the electrically driven vehicle 1.

The battery sensor 44 includes, for example, a current sensor, a voltage sensor and a temperature sensor. The battery sensor 44 is built into the battery system 40 or attached to the battery system 40. The battery sensor 44 detects, for example, a current value, a voltage value and a temperature of the battery 42. The battery sensor 44 outputs the detected current value, voltage value, temperature, and the like, to the control device 50.

The heater 46 is provided at a position where heat is transferred to the battery 42, and heats the battery 42 using electric power stored in the battery 42. The heater 46 heats the battery 42 under control by a battery ECU (not shown) and operates, for example, when a temperature of the battery 42 detected by the battery sensor 44 is less than a predetermined temperature. The heater 46 is an example of "a heating part."

The SOC calculating part 48 calculates a state of charge (SOC; hereinafter, also referred to as "a battery charging rate") of the battery 42 on the basis of the output of the battery sensor 44.

The FC unit 100 includes a fuel cell. The fuel cell generates power by reacting hydrogen contained in a fuel gas as a fuel with oxygen contained in air as oxidizer. The FC unit 100 outputs the generated electric power to, for example, a DC link between the converter 32 and the BTVCU 34. Accordingly, the electric power supplied by the FC unit 100 is supplied to the motor 12 via the converter 32, supplied to the battery system 40 via the BTVCU 34, or stored in the battery 42.

The control device 50 includes, for example, a motor control part 52, a brake control part 54 and an electric power control part 56. The motor control part 52, the brake control part 54, and the electric power control part 56 may be substituted with separate control devices, for example, control devices that are referred to as a motor ECU, a brake ECU and a battery ECU.

The motor control part 52 calculates a driving force required for the motor 12 on the basis of the output of the vehicle sensor 20, and controls the motor 12 such that the calculated driving force is output.

The brake control part 54 calculates a braking force required by the brake device 16 on the basis of the output of the vehicle sensor 20, and controls the brake device 16 such that the calculated braking force is output.

The electric power control part 56 calculates a total required electric power required for the battery system 40 and the FC unit 100 on the basis of the output of the vehicle sensor 20. For example, the electric power control part 56 calculates a torque to be output by the motor 12 on the basis of the accelerator opening degree and the vehicle speed, and calculates a total required electric power by adding a driving shaft demand electric power obtained from the torque and a rotational speed of the motor 12, and the electric power required by auxiliary machinery and the like.

The electric power control part 56 calculates a required charge/discharge electric power of the battery 42 from the SOC of the battery 42. Then, the electric power control part 56 subtracts the required charge/discharge electric power of the battery 42 from the total required electric power (a discharge side is assumed as positive), calculates a required FC electric power required by the FC unit 100, and causes the FC unit 100 to generate the electric power corresponding to the calculated required FC electric power.

The charging port 60 is directed toward a side outward from a vehicle body of the electrically driven vehicle 1. The charging port 60 is connected to a charging device 200 or the feeding apparatus 210. The charging device 200 is a device configured to supply electric power at the battery system 40 using a commercial power supply (or acquire electric power when V2G is performed). When a charging connector connected to the charging device 200 is inserted into the charging port 60, the charging port 60 and the charging device 200 are connected to each other.

The feeding apparatus 210 is able to be connected to an electrically driven device 220, and the electric power supplied from the battery system 40 is supplied to the electrically driven device 220. The feeding apparatus 210 includes, for example, an electric power converter built therein, converts current supplied from the battery system 40 via the charging port 60, for example, direct current, into alternating current, and feeds the alternating current to the electrically driven device 220. The electrically driven device 220 is an electrically driven device that is usable outdoors, for example, at a camping ground or the like, and includes a rice cooker, a large-size heater, an air-conditioner, or the like.

The electric power control part 56 performs generation control of the FC unit 100 when the electric power stored in the battery system 40 is supplied to the electrically driven device 220 via the feeding apparatus 210. In this case, the electric power control part 56 alternately executes first control of causing the FC unit 100 to generate power and increasing the SOC of the battery 42 and second control of restricting a power generation amount of the FC unit 100 to be smaller than that in the first control and decreasing the SOC of the battery 42. For example, the electric power control part 56 causes the FC unit 100 to generate power in the first control, and decreases a power generation amount per hour of the FC unit 100 in the second control to be smaller than that in the first control. Here, "decreasing" the power generation amount per hour of the FC unit 100 includes stopping power generation of the FC unit 100. Accordingly, the electric power control part 56 may stop the power generation of the FC unit 100 in the second control.

The electric power control part 56 gives priority to the power generation efficiency of the FC unit 100 to perform power generation in the first control. For example, the electric power control part 56 causes the FC unit 100 to generate power at a power generation amount with a high power generation efficiency of the FC unit 100 in the first control. For example, the electric power control part 56 may cause the FC unit 100 to generate power at a power generation amount with the highest power generation efficiency of the FC unit 100 in the first control (not a second power generation amount, which will be described below).

The electric power control part 56 is switched to the second control when the SOC of the battery 42 is a first threshold or more in the first control, and switched to the first control when the SOC of the battery 42 is decreased to be less than a second threshold in the second control.

<FC Unit 100>

Figure 2:
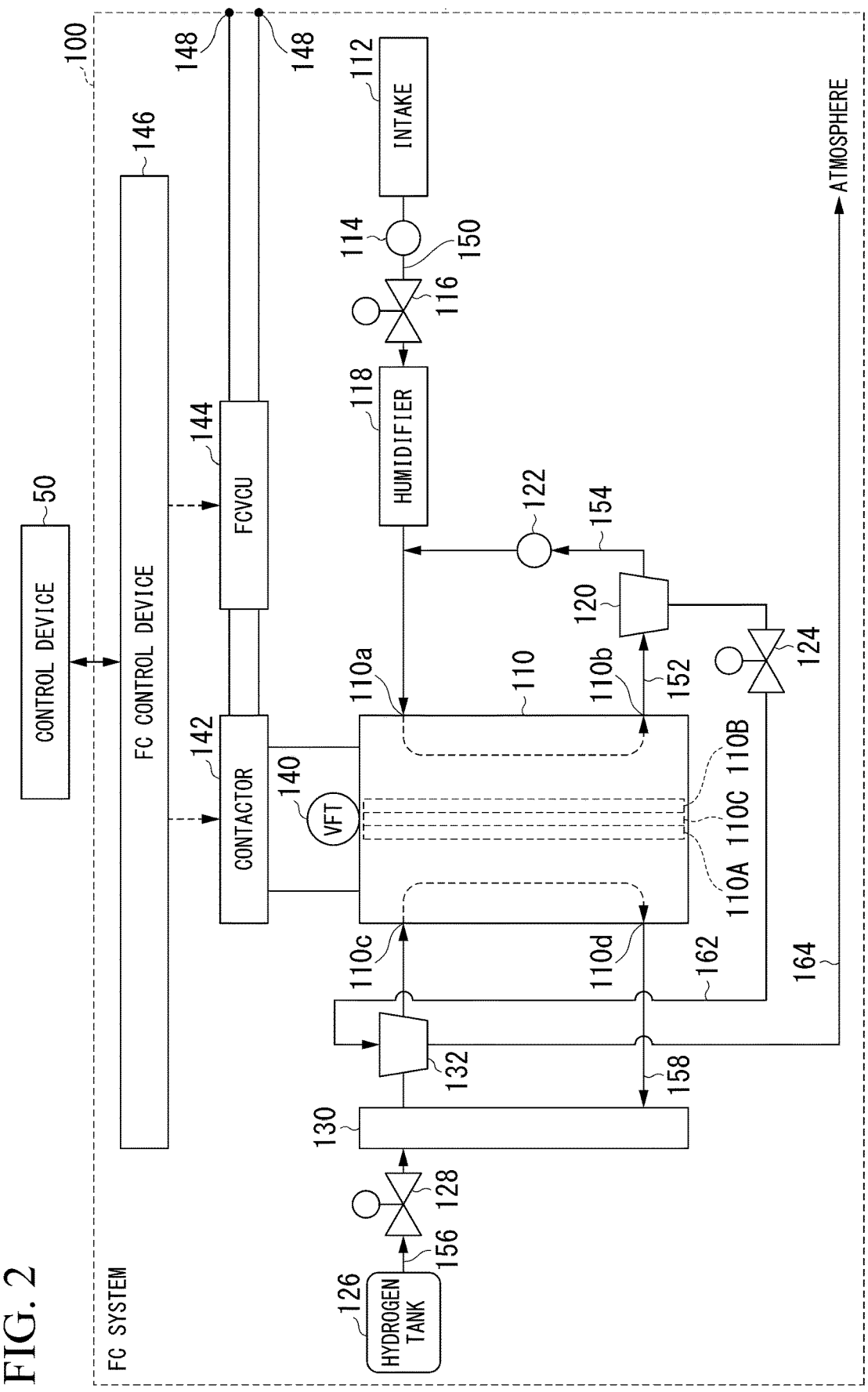
FIG. 2 is a view showing an example of a configuration of a fuel cell (FC) unit according to the first embodiment.

FIG. 2 is a view showing an example of a configuration of the FC unit 100 according to the first embodiment.

As shown in FIG. 2, the FC unit 100 includes, for example, an FC stack 110, an intake 112, an air pump 114, a sealing inlet valve 116, a humidifier 118, a gas-liquid separator 120, an exhaust recirculation pump 122, a drain valve 124, a hydrogen tank 126, a hydrogen supply valve 128, a hydrogen circulating part 130, a gas-liquid separator 132, a temperature sensor 140, a contactor 142, a fuel cell voltage control unit (FCVCU) 144 and an FC control device 146.

The FC stack 110 includes a fuel cell stack (not shown) in which a plurality of fuel cells are stacked, and a pair of end plates (not shown) configured to sandwich the fuel cell stack from both sides in a stacking direction.

The fuel cell includes a membrane electrode assembly (MEA), and a pair of separators that sandwich the membrane electrode assembly from both sides in a joining direction.

The membrane electrode assembly includes an anode 110A constituted by an anode catalyst and a gas diffusion layer, a cathode 110B constituted by a cathode catalyst and a gas diffusion layer, and a solid polymer electrolyte membrane 110C constituted by a cation-exchange membrane or the like sandwiched between the anode 110A and the cathode 110B from both sides in a thickness direction.

A fuel gas that contains hydrogen as a fuel is supplied to the anode 110A from the hydrogen tank 126, and air that is an oxidant gas (reactant gas) containing oxygen as an oxidizer is supplied to the cathode 110B from the air pump 114.

The hydrogen supplied to the anode 110A is ionized by a catalyst reaction on the anode catalyst, and hydrogen ions are moved to the cathode 110B via the solid polymer electrolyte membrane 110C that is appropriately humidified. Electrons generated according to movement of the hydrogen ions can be taken out to the external circuit (the FCVCU 144 or the like) as direct current.

The hydrogen ions moved onto the cathode catalyst of the cathode 110B from the anode 110A react with the oxygen supplied to the cathode 110B and the electrons on the cathode catalyst to generate water.

The air pump 114 includes a motor or the like driven and controlled by the FC control device 146, takes in and compresses air from the outside via the intake 112 using the driving force of the motor, and sends the air after compression to an oxidant gas supply path 150 connected to the cathode 110B.

The sealing inlet valve 116 is provided in the oxidant gas supply path 150 that connects the air pump 114 and a cathode supply port 110a configured to supply air to the cathode 110B of the FC stack 110, and is opened and closed by control of the FC control device 146.

The humidifier 118 humidifies the air sent to the oxidant gas supply path 150 from the air pump 114. More specifically, the humidifier 118 includes a water-permeable membrane such as a hollow fiber membrane or the like, and adds moisture to the air by bringing the air from the air pump 114 into contact with the moisture via the water-permeable membrane.

The gas-liquid separator 120 separates a cathode exhaust gas and liquid water discharged to an oxidant gas discharge path 152 which have not been consumed by the cathode 110B. The cathode exhaust gas separated from the liquid water by the gas-liquid separator 120 flows into an exhaust gas recirculation path 154.

The exhaust gas recirculation pump 122 is provided in the exhaust gas recirculation path 154, mixes the cathode exhaust gas flowing to the exhaust gas recirculation path 154 from the gas-liquid separator 120 with the air flowing through the oxidant gas supply path 150 from the sealing inlet valve 116 toward the cathode supply port 110a, and supplies the mixture to the cathode 110B again.

The liquid water separated from the cathode exhaust gas by the gas-liquid separator 120 is discharged to the gas-liquid separator 132 provided in a fuel gas supply path 156 via a connecting path 162. The liquid water discharged to the gas-liquid separator 132 is discharged to the atmosphere via a drain pipe 164.

The hydrogen tank 126 stores hydrogen in a compressed state.

The hydrogen supply valve 128 is provided in the fuel gas supply path 156 that connects the hydrogen tank 126 and an anode supply port 110c configured to supply hydrogen to the anode 110A of the FC stack 110. The hydrogen supply valve 128 supplies the hydrogen stored in the hydrogen tank 126 to the fuel gas supply path 156 when the valve is opened by control of the FC control device 146.

The hydrogen circulating part 130 circulates the anode exhaust gas discharged to a fuel gas discharge path 158 through the fuel gas supply path 156 without being consumed by the anode 110A.

The gas-liquid separator 132 separates the anode exhaust gas and the liquid water that circulate from the fuel gas discharge path 158 to the fuel gas supply path 156 using an action of the hydrogen circulating part 130. The gas-liquid separator 132 supplies the anode exhaust gas separated from the liquid water to the anode supply port 110c of the FC stack 110.

The temperature sensor 140 detects temperatures of the anode 110A and the cathode 110B of the FC stack 110, and outputs the detection signals to the FC control device 146.

The contactor 142 is provided between the anode 110A and the cathode 110B of the FC stack 110 and the FCVCU 144. The contactor 142 electrically connects or disconnects a space between the FC stack 110 and the FCVCU 144 on the basis of the control from the FC control device 146.

The FCVCU 144 is, for example, a boosting type DC-DC converter. The FCVCU 144 is disposed between the anode 110A and the cathode 110B of the FC stack 110 and an electric load via the contactor 142. The FCVCU 144 boosts a voltage of an output terminal 148 connected to the side of the electric load to a target voltage determined by the FC control device 146. For example, the FCVCU 144 boosts the voltage output from the FC stack 110 to the target voltage and outputs the boosted voltage to the output terminal 148.

The FC control device 146 performs warming-up control of the FC unit 100 when it is determined by the electric power control part 56 that warming-up of the FC unit 100 is necessary and the required FC electric power required by the FC unit 100 is a predetermined value or more. For example, the electric power control part 56 acquires a detection signal of the temperature sensor 140 from the FC control device 146, and determines that warming-up of the FC unit 100 is required when the temperature of the FC stack 110 detected by the temperature sensor 140 is less than a temperature threshold. In addition, the electric power control part 56 acquires the detection signal by the temperature sensor 140 from the FC control device 146 while the warming-up control of the FC unit 100 is performed, and determines that the warming-up control of the FC unit 100 has been terminated when the temperature of the FC stack 110 detected by the temperature sensor 140 has become the temperature threshold or more.

[Warming-Up Control of FC Unit]

The FC unit 100 first opens the drain valve 124 when the warming-up control is performed. Next, the FC unit 100 opens the sealing inlet valve 116 and the hydrogen supply valve 128, supplies the oxidant gas to the cathode 110B of the FC stack 110 from the intake 112 via the oxidant gas supply path 150, and supplies hydrogen gas to the anode 110A of the FC stack 110 from the hydrogen tank 126 via the fuel gas supply path 156. Accordingly, power generation in the FC stack 110 is performed.

In this case, since the drain valve 124 is open, the non-reacted oxidant gas discharged from the cathode 110B is supplied to the gas-liquid separator 132 from the gas-liquid separator 120 via the connecting path 162 after the gas is taken to the oxidant gas supply path 150 through the intake 112. Then, the oxidant gas separated from the liquid water by the gas-liquid separator 132 is supplied to the anode 110A of the FC stack 110 together with the hydrogen gas supplied from the hydrogen tank 126. As a result, an exothermic reaction (catalyst combustion) is caused on the anode 110A of the FC stack 110 by the oxidant gas and the fuel gas. According to the exothermic reaction, the FC stack 110 is rapidly heated.

After that, the FC unit 100 closes the drain valve 124 when it is determined that the warming-up control of the FC unit 100 is terminated by the electric power control part 56. Accordingly, the oxidant gas is not supplied to the anode 110A of the FC stack 110, and the exothermic reaction on the anode 110A of the FC stack 110 is stopped.

[Output Control of FC Unit]

Figure 3:
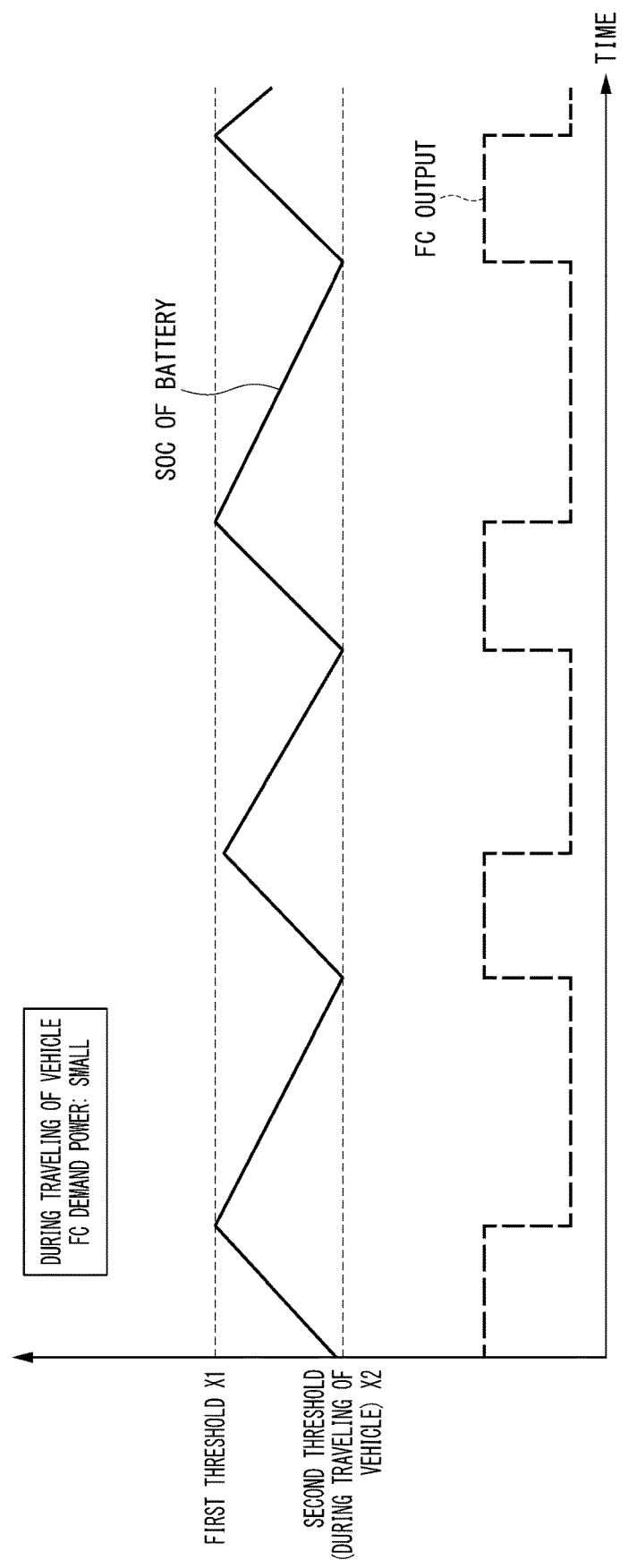
FIG. 3 is a graph showing an example of an SOC of a battery and an FC output during traveling of a vehicle when the required FC electric power is relatively small.

FIG. 3 is a graph showing an example of the SOC of the battery 42 and the electric power output from the FC unit 100 ("FC output") when the required FC electric power required by the FC unit 100 is relatively small during traveling of the vehicle. In the example shown in FIG. 3, the FC unit 100 outputs the electric power to the battery 42 from the FC unit 100 to increase the SOC of the battery 42 when an initial value of the SOC of the battery 42 is less than a first threshold X1. In this case, for example, the FC unit 100 performs power generation at a power generation amount with maximum power generation efficiency, and outputs the generated electric power at the battery 42.

Next, the FC unit 100 restricts the electric power output to the battery 42 from the FC unit 100 and reduces the SOC of the battery 42 when the SOC of the battery 42 reaches the first threshold X1. Next, the FC unit 100 returns the electric power output to the battery 42 from the FC unit 100 to a state before restriction and increases the SOC of the battery 42 when the SOC of the battery 42 reaches a second threshold X2. As a result, the control of increasing the SOC of the battery 42 from the second threshold X2 to the first threshold X1 and the control of decreasing the SOC of the battery 42 from the first threshold X1 to the second threshold X2 are repeated.

Figure 4:
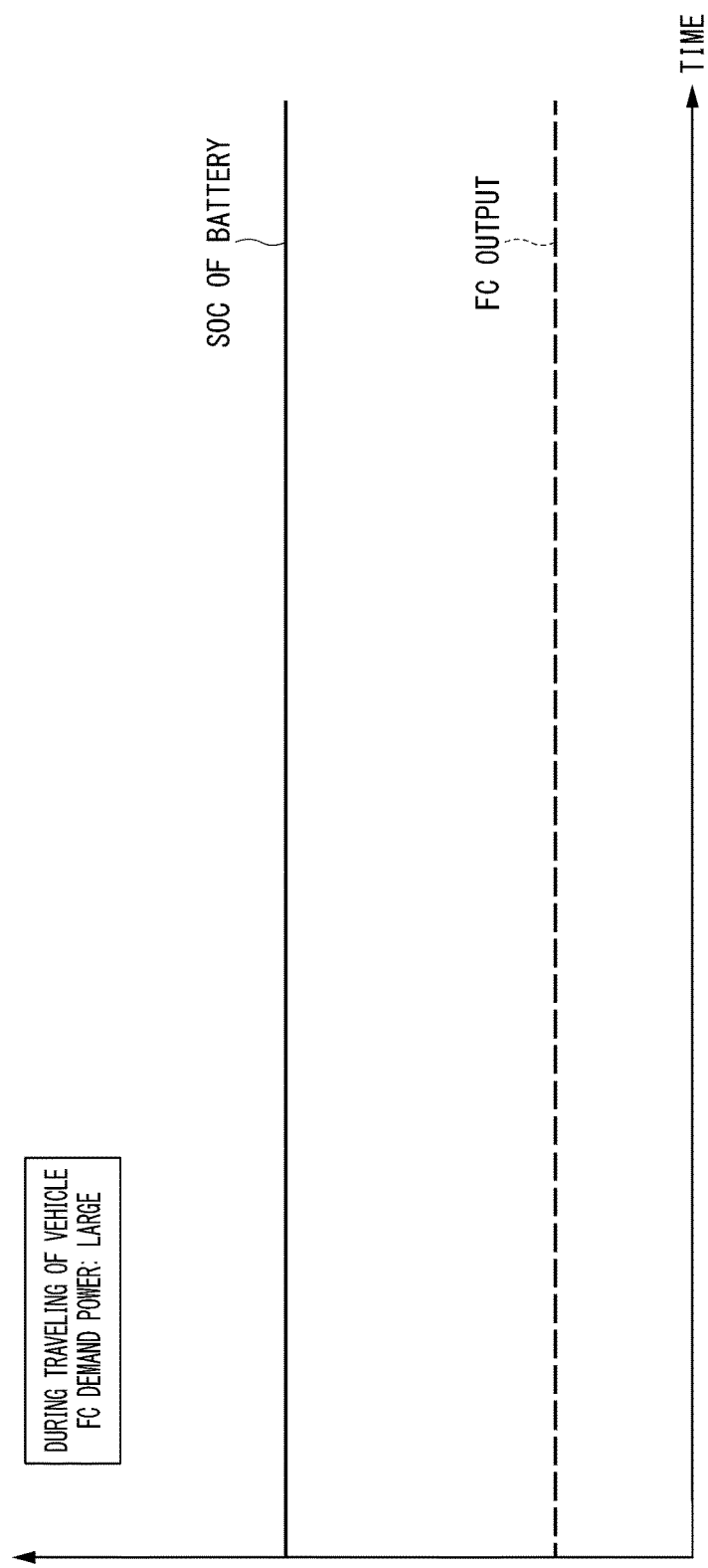
FIG. 4 is a graph showing an example of the SOC of the battery and the FC output during traveling of the vehicle when the required FC electric power is relatively large.

FIG. 4 is a graph showing an example of an SOC of the battery 42 and electric power output from the FC unit 100 when the required FC electric power required by the FC unit 100 is relatively large during traveling of the vehicle. In the example shown in FIG. 4, the FC unit 100 outputs the driving force used for traveling of the electrically driven vehicle 1 to the driving wheels 14 from the motor 12 using the electric power generated in the FC unit 100 without using the electric power stored in the battery 42. As a result, the SOC of the battery 42 is maintained, power generation in the FC unit 100 is performed according to the required FC electric power required by the FC unit 100, and the generated electric power is output to the motor 12.

Figure 5:
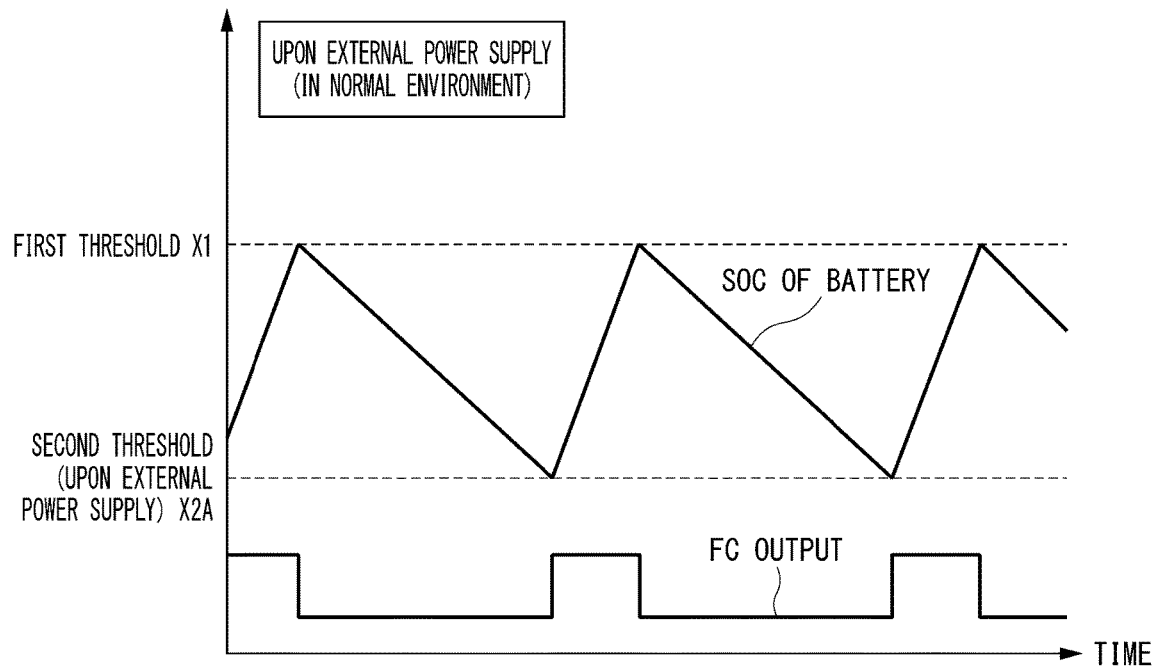
FIG. 5 is a graph showing an example of the SOC of the battery and the FC output upon external power supply under a normal environment.

FIG. 5 is a graph showing an example of an SOC of the battery 42 and electric power output from the FC unit 100 upon external power supply under a normal environment. In the example shown in FIG. 5, the FC unit 100 repeats increasing the SOC of the battery 42 from the second threshold X2A to the first threshold X1 by performing the first control at the first power generation amount and decreasing the SOC of the battery 42 from the first threshold X1 to the second threshold X2A by performing the second control. For example, the second threshold X2A upon external power supply is set to be smaller than in the second threshold X2 during traveling of the vehicle.

Figure 6:
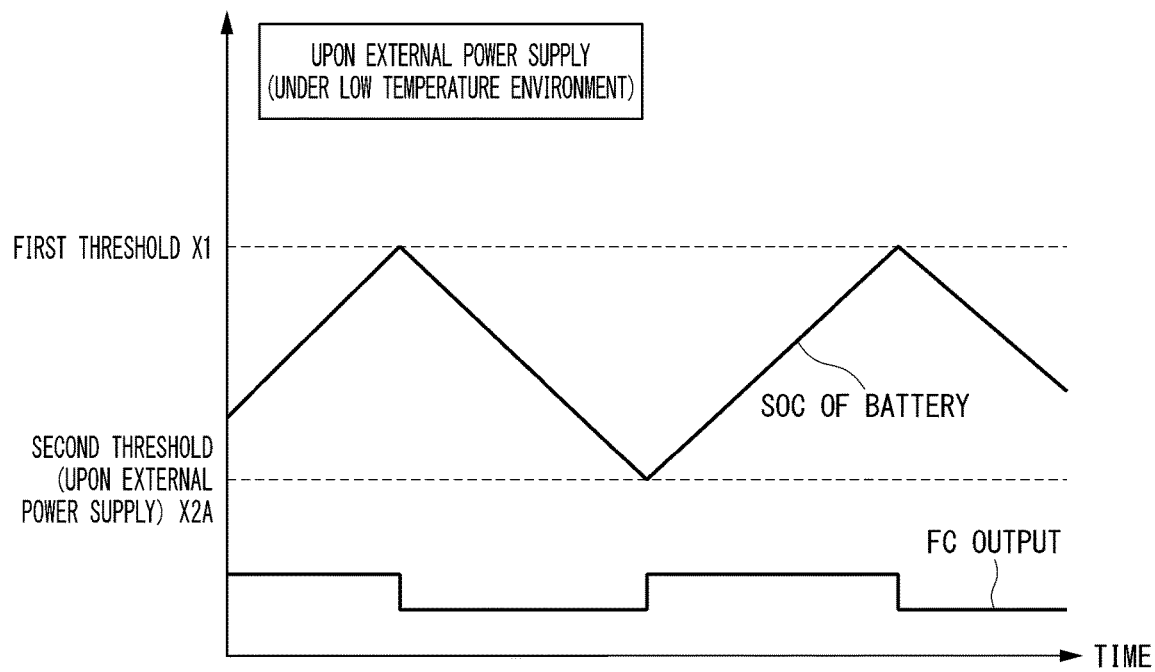
FIG. 6 is a graph showing an example of the SOC of the battery and the FC output upon external power supply under a low temperature environment.

FIG. 6 is a graph showing an example of an SOC of the battery 42 and electric power output from the FC unit 100 upon external power supply under a low temperature environment. In the example shown in FIG. 6, the FC unit 100 repeats increasing the SOC of the battery 42 from the second threshold X2A to the first threshold X1 by performing the first control at the second power generation amount and decreasing the SOC of the battery 42 from the first threshold X1 to the second threshold X2A by performing the second control. The second power generation amount is smaller than the first power generation amount.

[Processing Flow of Fuel Cell System]

Figure 7:
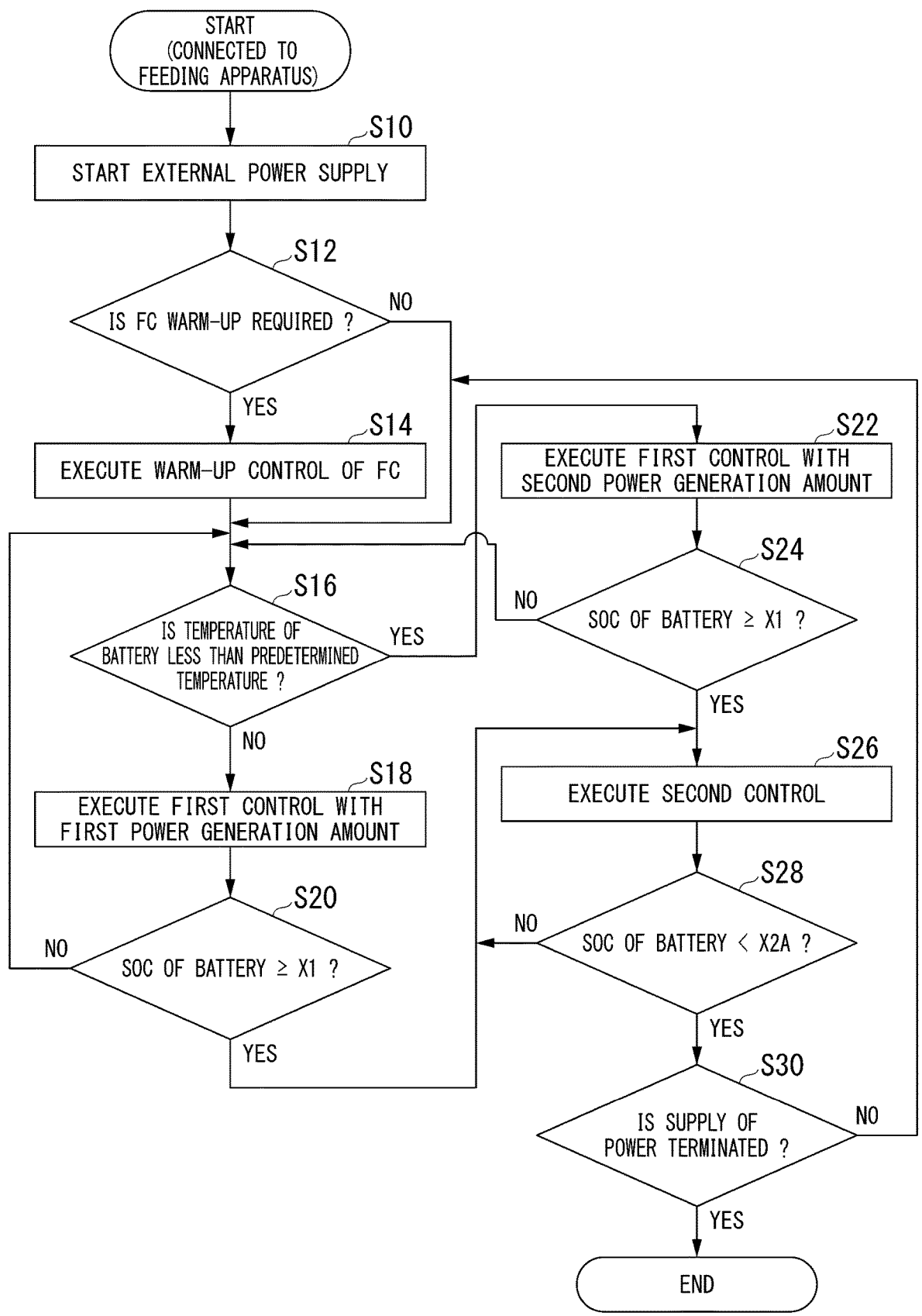
FIG. 7 is a flowchart showing an example of a flow of a series of processes in a fuel cell system according to the first embodiment.

Hereinafter, a flow of a series of processes in the control device 50 that is a control computer of the fuel cell system 10 according to the first embodiment will be described using a flowchart. FIG. 7 is a flowchart showing an example of a flow of processing executed by the control device 50. The flowchart shown in FIG. 7 is executed, for example, when the battery system 40 is connected to the feeding apparatus 210 via the charging port 60.

The electric power control part 56 first starts external power supply to the feeding apparatus 210 (step S10). The feeding apparatus 210 supplies the electric power stored in the battery 42 to the electrically driven device 220 via the charging port 60 when the external power supply is started.

The electric power control part 56 determines whether the warming-up of the FC unit 100 is required on the basis of the temperature of the FC stack 110 detected by the temperature sensor 140 (step S12). The electric power control part 56 performs the warming-up control of the FC unit 100 when it is determined that the warming-up of the FC unit 100 is required (step S14).

Next, the electric power control part 56 determines whether the temperature of the battery 42 detected by the battery sensor 44 is less than the predetermined temperature (step S16). The electric power control part 56 performs the first control of causing the FC unit 100 to generate power at a first power generation amount when it is determined the temperature of the battery 42 is equal to or greater than a predetermined temperature (step S18). When the FC unit 100 generates the power at the first power generation amount, the SOC of the battery 42 is increased. Next, the electric power control part 56 determines whether the SOC of the battery 42 calculated by the SOC calculating part 48 is equal to or greater than the first threshold X1 (step S20). The electric power control part 56 returns the processing to step S16 when the SOC of the battery 42 is less than the first threshold X1. The electric power control part 56 shifts the processing to step S26 when it is determined that the SOC of the battery 42 is equal to or greater than the first threshold X1.

The electric power control part 56 performs the first control of causing the FC unit 100 to generate power at the second power generation amount when the temperature of the battery 42 detected by the battery sensor 44 is less than the predetermined temperature (step S22). The second power generation amount is smaller than the first power generation amount. When the FC unit 100 generates power at the second power generation amount, in comparison with the case in which the FC unit 100 generates power at the first power generation amount, a rate of increase in the SOC of the battery 42 becomes relatively slow. Next, the electric power control part 56 determines whether the SOC of the battery 42 calculated by the SOC calculating part 48 is equal to or greater than the first threshold X1 (step S24). The electric power control part 56 returns the processing to step S16 when it is determined that the SOC of the battery 42 is less than the first threshold X1. The electric power control part 56 shifts the processing to step S26 when it is determined that the SOC of the battery 42 is equal to or greater than the first threshold X1.

Next, the electric power control part 56 performs the second control (step S26). Next, the electric power control part 56 determines whether the SOC of the battery 42 calculated by the SOC calculating part 48 is less than the second threshold X2A (step S28). The electric power control part 56 continues the second control until the SOC of the battery 42 has become less than the second threshold X2A.

The electric power control part 56 determines whether external power supply is terminated when it is determined that the SOC of the battery 42 is less than the second threshold X2A (step S30). The electric power control part 56 determines that external power supply is terminated, for example, when connection between the battery system 40 and the feeding apparatus 210 is released or a predetermined operation is received. The electric power control part 56 returns the processing to step S16 when it is determined that external power supply is not terminated. Then, the electric power control part 56 repeats the first control and the second control until it is determined that external power supply is terminated. Meanwhile, the electric power control part 56 terminates the processing of the flowchart when it is determined that external power supply is terminated.

Figure 8:
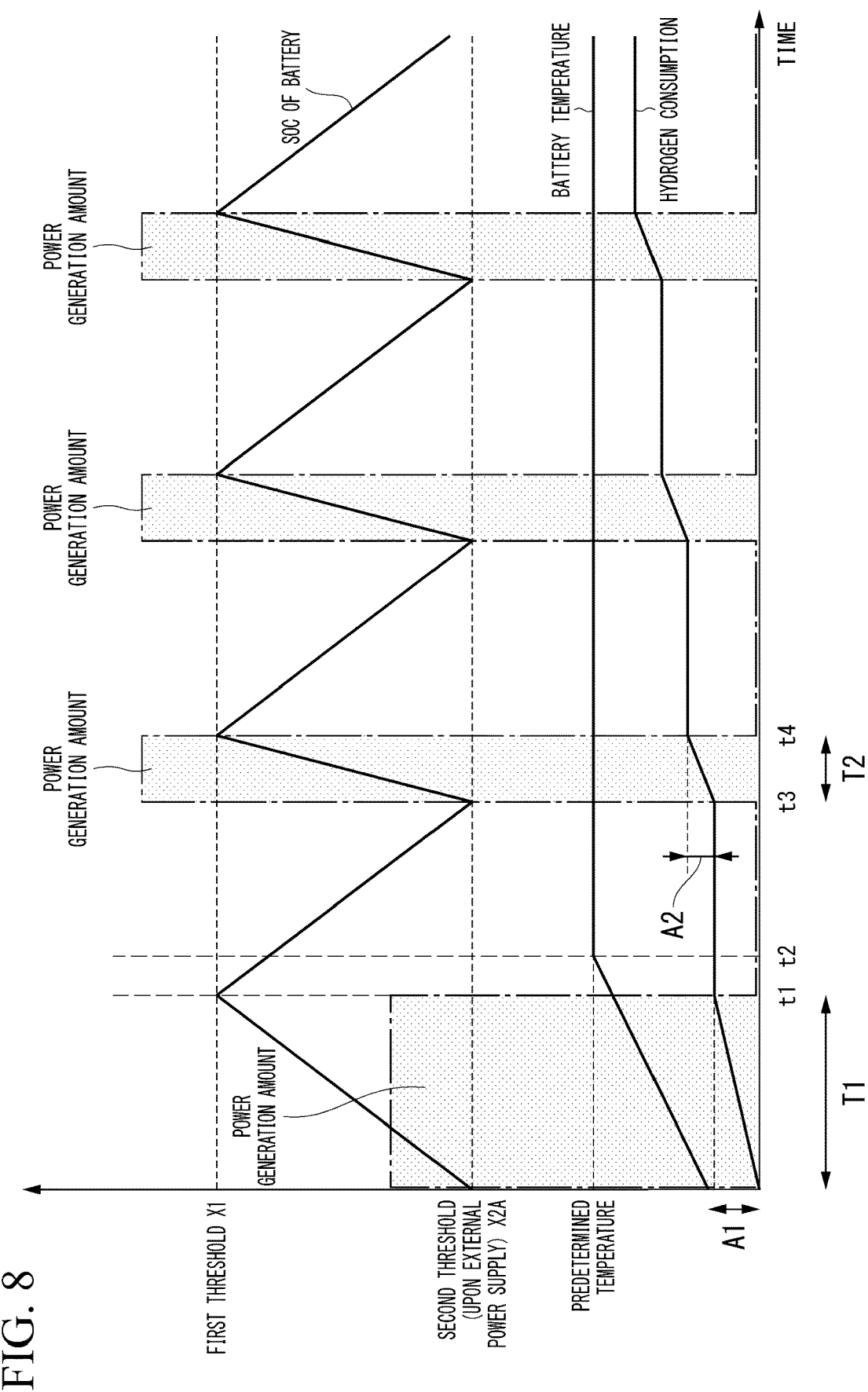
FIG. 8 is a view for describing an operation of the fuel cell system according to the first embodiment.

FIG. 8 is a view for describing an operation of the fuel cell system 10 according to the first embodiment. In the example shown in the drawing, an example of the case in which an initial value of a temperature of the battery 42 is less than a predetermined temperature at a time when external power supply is started will be described.

As shown in FIG. 8, when the electric power control part 56 starts external power supply, control of increasing the SOC of the battery 42 from the second threshold X2A to the first threshold X1 and control of decreasing the SOC of the battery 42 from the first threshold X1 to the second threshold X2A are repeated. In this case, immediately after the electric power control part 56 starts external power supply, in the electric power control part 56, since the temperature of the battery 42 is less than the predetermined temperature, the power generation amount in the first control is controlled such that it is the second power generation amount. Here, the electric power stored in the battery 42 is supplied to the heater 46, and the temperature of the battery 42 is increased while heat is generated through charge/discharge of the battery 42. In the example shown, since the temperature of the battery 42 is equal to or greater than the predetermined temperature at a time t2, the power generation amount in the first control is switched to the first power generation amount. As a result, the electric power output to the battery 42 from the FC unit 100 is restricted.

In addition, the electric power control part 56 supplies the electric power stored in the battery 42 to the heater 46 to generate heat from the heater 46 when the temperature of the battery 42 is less than the predetermined temperature. As a result, the battery 42 is heated by the heater 46 and the temperature of the battery 42 is increased. In the example shown, since the temperature of the battery 42 is the predetermined temperature while the SOC of the battery 42 is decreased to the first threshold X1 at a time t2, the power generation amount in the first control is switched to the second power generation amount. The electric power control part 56 performs the first control of causing the FC unit 100 to generate power with the first power generation amount after the SOC of the battery 42 is reduced to become the second threshold X2A at a time t3.

In this case, a time required T2 in which the SOC of the battery 42 is increased from the second threshold X2A to the first threshold X1 while the power generation amount in the first control is controlled to the first power generation amount is shorter than a time required T1 in which the SOC of the battery 42 is increased from the second threshold X2A to the first threshold X1 while the power generation amount in the first control is controlled to the second power generation amount.

In addition, a hydrogen consumption A2 by the FC unit 100 until the SOC of the battery 42 is increased from the second threshold X2A to the first threshold X1 while the power generation amount in the first control is controlled to the first power generation amount is smaller than a hydrogen consumption A1 by the FC unit 100 until the SOC of the battery 42 is increased from the second threshold X2A to the first threshold X1 while the power generation amount in the first control is controlled to the second power generation amount.

According to the fuel cell system 10 of the above-mentioned first embodiment, electric power can be supplied to the electrically driven device 220 outside the vehicle while protecting the battery 42. For example, since the charging capacity of the battery 42 is decreased when the temperature of the battery 42 is low, a large amount of electric power cannot be charged and discharged at high speed. When the FC unit 100 generates power with a certain generated output, while the battery 42 is charged with the electric power, which is the difference between the generated output of the FC unit 100 and the electric power supplied to the electrically driven device 220 outside the vehicle, according to the fuel cell system 10 of the first embodiment, when the temperature of the battery 42 is lower than the predetermined temperature, a power generation amount per hour of the FC unit 100 is reduced in comparison with the case in which the temperature of the battery 42 is equal to or greater than the predetermined temperature. Accordingly, electric power can be supplied to the electrically driven device 220 outside the vehicle while minimizing an increase in power output of the battery 42 and protecting the battery 42.

In addition, according to the fuel cell system 10 of the first embodiment, it is possible to lengthen a lifetime of the components of the FC unit 100. For example, while the components of the FC unit 100 may be deteriorated when the FC unit 100 continuously performs the power generation, it is possible to lengthen a lifetime of the components of the FC unit 100 by causing the FC unit 100 to intermittently generate power.

In addition, according to the fuel cell system 10 of the first embodiment, when the temperature of the battery 42 is equal to or greater than the predetermined temperature upon external power supply, since the FC unit 100 generates power with the power generation amount at the maximum efficiency, fuel consumption can be improved.

Second Embodiment

Hereinafter, a second embodiment will be described. Processing details of the second embodiment are different from those in the first embodiment in that power feeding to an electrically driven device is performed using an external battery provided outside the vehicle as well as the battery 42 according to a function of a feeding apparatus. Hereinafter, these differences will be mainly described.

Figure 9:
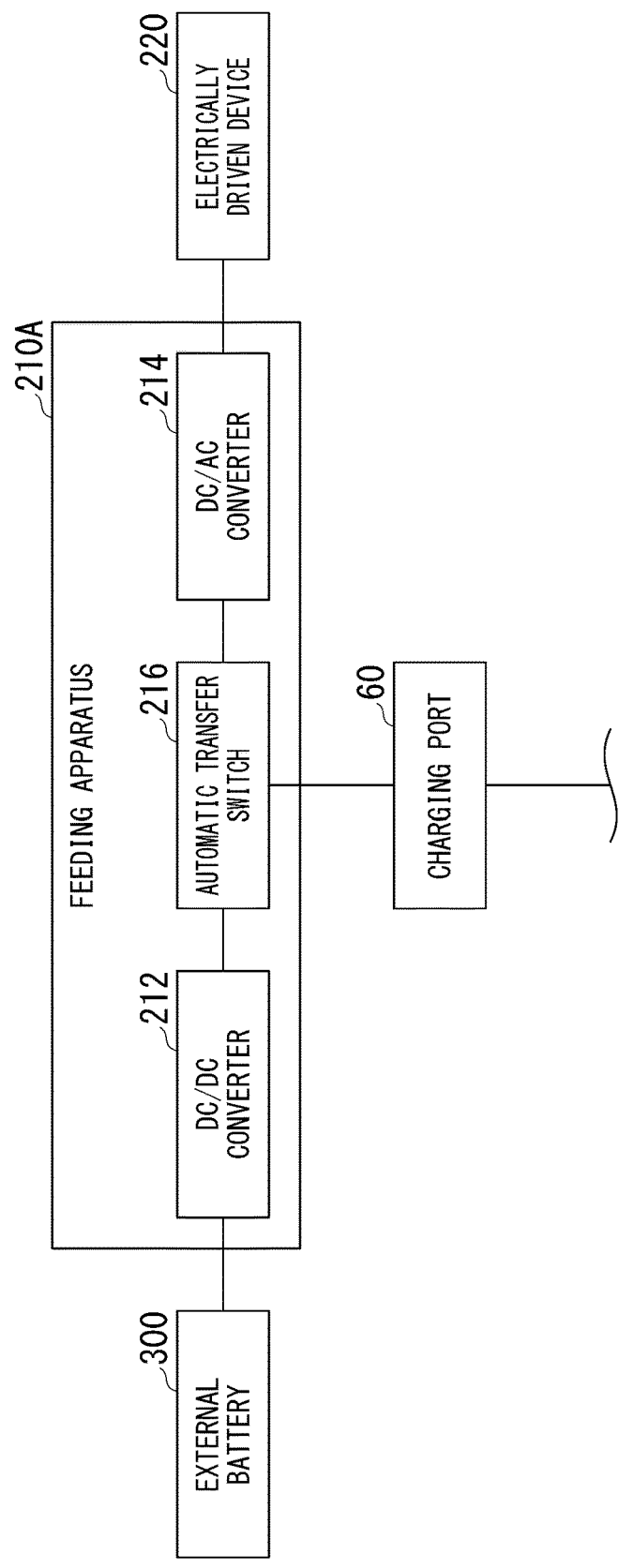
FIG. 9 is a view showing an example of a configuration of a feeding apparatus of a second embodiment.

FIG. 9 is a view showing an example of a configuration of a feeding apparatus 210A according to the second embodiment. In the example shown in FIG. 9, the feeding apparatus 210A includes, for example, a DC/DC converter 212, a DC/AC converter 214 and an automatic transfer switch 216. The feeding apparatus 210A is able to be connected to the charging port 60, an external battery (external electrical storage device) 300, and the electrically driven device 220.

The external battery 300 is a secondary battery such as a lithium ion battery or the like. The electric power stored in the battery system 40 or the electric power generated by the FC unit 100 is supplied to the external battery 300 via the feeding apparatus 210A. The electric power stored in the external battery 300 is supplied to the electrically driven device 220 via the feeding apparatus 210A.

The DC/DC converter 212 transforms the DC voltage supplied from the external battery 300 to output the transformed DC voltage to the DC/AC converter 214.

The DC/AC converter 214 converts the DC voltage transformed by the DC/DC converter 212 into an AC voltage and outputs the converted AC voltage to the electrically driven device 220. In addition, the DC/AC converter 214 transforms the DC voltage supplied from the battery system 40 or the FC unit 100 via the charging port 60 into a rated AC voltage (for example, 100 [V]) used by the electrically driven device 220 and outputs the rated AC voltage to the electrically driven device 220.

The automatic transfer switch 216 is provided between the DC/DC converter 212 and the DC/AC converter 214 in the feeding apparatus 210A, and connected to the charging port 60. The automatic transfer switch 216 switches the connection between the charging port 60, and the DC/DC converter 212 and the DC/AC converter 214 on the basis of the control from the electric power control part 56. For example, the automatic transfer switch 216 realizes (1) a state in which the electric power output from the battery system 40 or the FC unit 100 is supplied to the external battery 300 and also supplied to the electrically driven device 220, and (2) a state in which the electric power output from at least one of the battery system 40 and the external battery 300 is supplied to the electrically driven device 220.

The automatic transfer switch 216 connects the charging port 60 and the DC/DC converter 212 and connects the charging port 60 and the DC/AC converter 214 when the state of (1) is realized. The automatic transfer switch 216 connects the charging port 60 and the DC/AC converter 214 or connects the DC/DC converter 212 and the DC/AC converter 214 when the state of (2) is realized.

Figure 10:
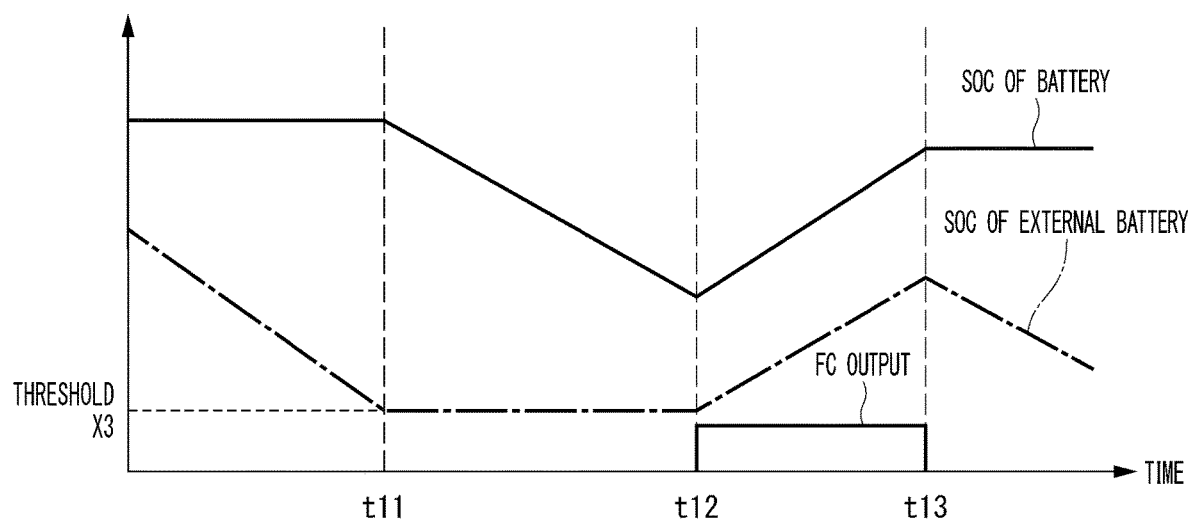
FIG. 10 is a view for describing an operation of a fuel cell system according to the second embodiment.

FIG. 10 is a view for describing an operation of the fuel cell system 10 according to the second embodiment. In the example shown in the drawing, an example of the case in which the SOC of the external battery 300 is equal to or greater than a predetermined value at a time when external power supply is started will be described.

As shown in FIG. 10, the feeding apparatus 210A feeds the electric power stored in the external battery 300 to the electrically driven device 220 until the SOC of the external battery 300 becomes a predetermined value X3 after external power supply is started.

The feeding apparatus 210A feeds the electric power stored in the battery 42 to the electrically driven device 220 when the SOC of the external battery 300 is a threshold X3 at a time t11. In this case, the SOC of the battery 42 is decreased according to supply of the electric power to the electrically driven device 220 from the battery 42.

The feeding apparatus 210A feeds the electric power generated in the FC unit 100 to both of the battery 42 and the external battery 300 when power generation is performed in the FC unit 100 at a time t12. As a result, both of the SOC of the battery 42 and the SOC of the external battery 300 are increased.

The feeding apparatus 210A feeds the electric power stored in the external battery 300 to the electrically driven device 220 until the SOC of the external battery 300 becomes a third threshold X3 again when the power generation in the FC unit 100 is stopped at a time t13.

According to the fuel cell system 10 of the above-mentioned second embodiment, in addition to exhibition of the same effects as those of the fuel cell system 10 according to the first embodiment, since a period of repeating the first control and the second control is lengthened upon external power supply, deterioration of the battery 42 or the like can be minimized.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel cell system comprising:
  a fuel cell;
  an electrical storage device with a temperature sensor built thereinto or attached thereto and configured to store electric power generated by the fuel cell; and
  a control device programmed to perform power generation control for at least the fuel cell,
  wherein the control device acquires a charging rate of the electrical storage device,
  wherein when the electric power stored in the electrical storage device is supplied to external devices, the control device performs a first control which causes the fuel cell to generate power and increases a charging rate of the electrical storage device and a second control which restricts a power generation amount of the fuel cell to be smaller than that in the first control and decreases a charging rate of the electrical storage device, and wherein the first control causes power generation at a power generation amount with a power generation efficiency being higher than a power generation efficiency of a power generation caused by the second control, and
  wherein when a temperature detected by the temperature sensor is lower than a predetermined temperature, a power generation amount per hour of the fuel cell in the first control is reduced in comparison with a case in which the temperature detected by the temperature sensor is equal to or greater than the predetermined temperature, wherein the control device switches the first control to the second control when the charging rate of the electrical storage device is increased to be equal to or greater than a first threshold in a case that the first control is performed, and wherein the control device switches the second control to the first control when the charging rate of the electrical storage device is decreased to be less than a second threshold in a case that the second control is performed.

2. The fuel cell system according to claim 1, wherein the fuel cell system is mounted on a vehicle, and further comprises a feeding apparatus configured to feed the electric power stored in the electrical storage device to devices external to the vehicle.

3. The fuel cell system according to claim 2, wherein the feeding apparatus is able to be connected to an external electrical storage device provided outside the vehicle, when the first control is performed by the control device, the electric power generated by the fuel cell is supplied to the external electrical storage device and also supplied to the devices external to the vehicle, and when the second control is performed by the control device, the electric power discharged from the electrical storage device and the electric power discharged from the external electrical storage device are supplied to the devices external to the vehicle.

4. The fuel cell system according to claim 3, wherein the feeding apparatus initially supplies the electric power discharged from the external electrical storage device to the devices when the second control is performed by the control device.

5. The fuel cell system according to claim 1, further comprising a heating part provided at a position at which heat is transferred to the electrical storage device and configured to generate heat using the electric power supplied from the electrical storage device, wherein the control device supplies the electric power stored in the electrical storage device to the heating part so as to generate heat when the temperature of the electrical storage device is less than the predetermined temperature.

6. A method of controlling a fuel cell system, which is performed by a control device of a fuel cell system comprising:

a fuel cell; and an electrical storage device with a temperature sensor built thereinto or attached thereto and configured to store electric power generated by the fuel cell, the method comprising:

performing generation control of at least the fuel cell;

acquiring a charging rate of the electrical storage device;

performing a first control which causes the fuel cell to generate power and increases a charging rate of the electrical storage device when the electric power stored in the electrical storage device is supplied to external devices and a second control which restricts a power generation amount of the fuel cell to be smaller than that in the first control and decreases a charging rate of the electrical storage device, wherein the first control causes power generation at a power generation amount with a power generation efficiency being higher than a power generation efficiency of a power generation caused by the second control;

reducing a power generation amount per hour of the fuel cell in the first control when the temperature detected by the temperature sensor is less than a predetermined temperature, in comparison with a case in which the temperature detected by the temperature sensor is equal to or greater than the predetermined temperature;

switching the first control to the second control when the charging rate of the electrical storage device is increased to be equal to or greater than a first threshold in a case that the first control is performed; and switching the second control to the first control when the charging rate of the electrical storage device is decreased to be less than a second threshold in a case that the second control is performed.

7. A computer-readable storage medium, on which a program is stored, the program configured to cause a control computer of a fuel cell system comprising:

a fuel cell; and an electrical storage device with a temperature sensor built thereinto or attached thereto and configured to store electric power generated by the fuel cell, to perform processing of performing generation control of at least the fuel cell;

processing of acquiring a charging rate of the electrical storage device;

processing of performing a first control which causes the fuel cell to generate power and increases a charging rate of the electrical storage device when the electric power stored in the electrical storage device is supplied to external devices and a second control which restricts a power generation amount of the fuel cell to be smaller than that in the first control and decreases a charging rate of the electrical storage device, wherein the first control causes power generation at a power generation amount with a power generation efficiency being higher than a power generation efficiency of a power generation caused by the second control;

processing of reducing a power generation amount per hour of the fuel cell in the first control when the temperature detected by the temperature sensor is less than a predetermined temperature, in comparison with a case in which the temperature detected by the temperature sensor is equal to or greater than the predetermined temperature switching the first control to the second control when the charging rate of the electrical storage device is increased to be equal to or greater than a first threshold in a case that the first control is performed; and switching the second control to the first control when the charging rate of the electrical storage device is decreased to be less than a second threshold in a case that the second control is performed.

\* \* \* \* \*